Oct. 26, 1943.  J. C. TRAVILLA, JR., ET AL  2,333,058
RAILWAY TRUCK STRUCTURE
Original Filed June 26, 1941   2 Sheets-Sheet 2

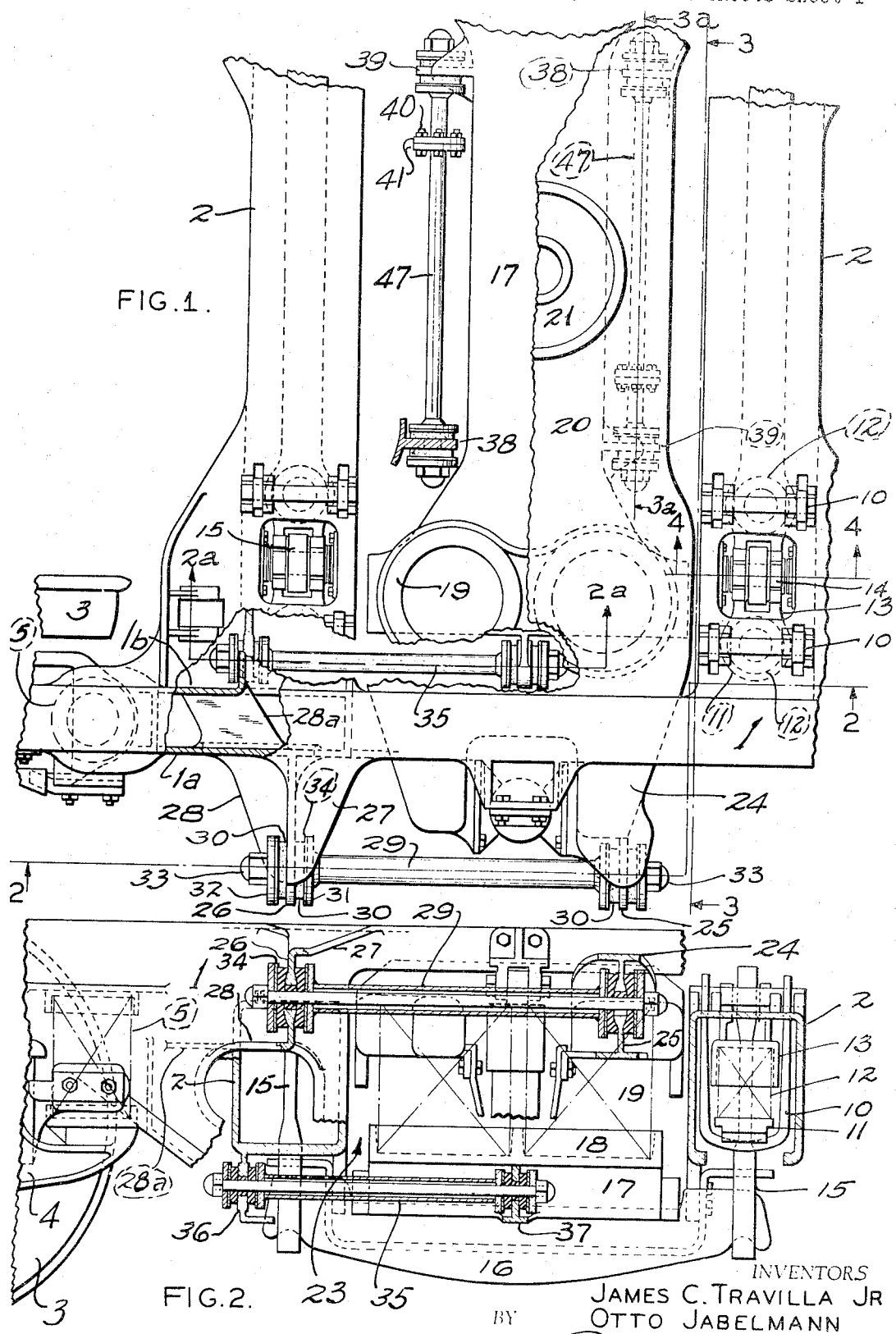

INVENTORS
JAMES C. TRAVILLA, JR.
OTTO JABELMANN
BY Rodney Bedell
ATTORNEY

Patented Oct. 26, 1943

2,333,058

UNITED STATES PATENT OFFICE 2,333,058

RAILWAY TRUCK STRUCTURE

James C. Travilla, Jr., Overbrook Hills, Pa., and Otto Jabelmann, Omaha, Nebr.; Teresa R. Jabelmann administratrix of said Otto Jabelmann, deceased; said Travilla, Jr., assignor to General Steel Castings Corporation, Granite City, Ill., a corporation of Delaware Original application June 26, 1941, Serial No. 399,838. Divided and this application February 2, 1942, Serial No. 429,194

7 Claims. (Cl. 105—190)

The invention relates to railway rolling stock and more particularly to a vehicle truck having a swinging bolster and means for controlling the play of the bolster relative to the other truck parts.

This application is a division of an earlier application filed June 26, 1941, Serial No. 399,838. Some of the general objects of the invention described herein correspond to those of the invention claimed in said earlier filed application; namely, the cushioning of forces transmitted between relatively movable truck parts, thereby avoiding binding, wear and replacement of the parts and the noises and shocks due to impacts and sliding contact between the parts, but in the present application these objects are restricted to the cushioning of the forces transmitted between the bolster and the spring plank, or other support for the bolster carrying springs, and the forces transmitted between the bolster and the truck frame.

These general objects and other detailed objects, as will appear below, are attained by the structure illustrated in the accompanying drawings in which—

Figure 1 is a top view of the central portion of a railway truck embodying the invention and showing portions of the side frame and transoms and a laterally movable bolster and its spring plank and connections between these parts. A portion of the bolster is broken away and some of the parts are sectioned horizontally to more clearly illustrate the invention.

Figure 2 is a side elevation and vertical longitudinal section taken on the line 2—2 of Figure 1. The lower part of Figure 2 shows portions sectioned on the line 2a—2a of Figure 1.

Figure 3:
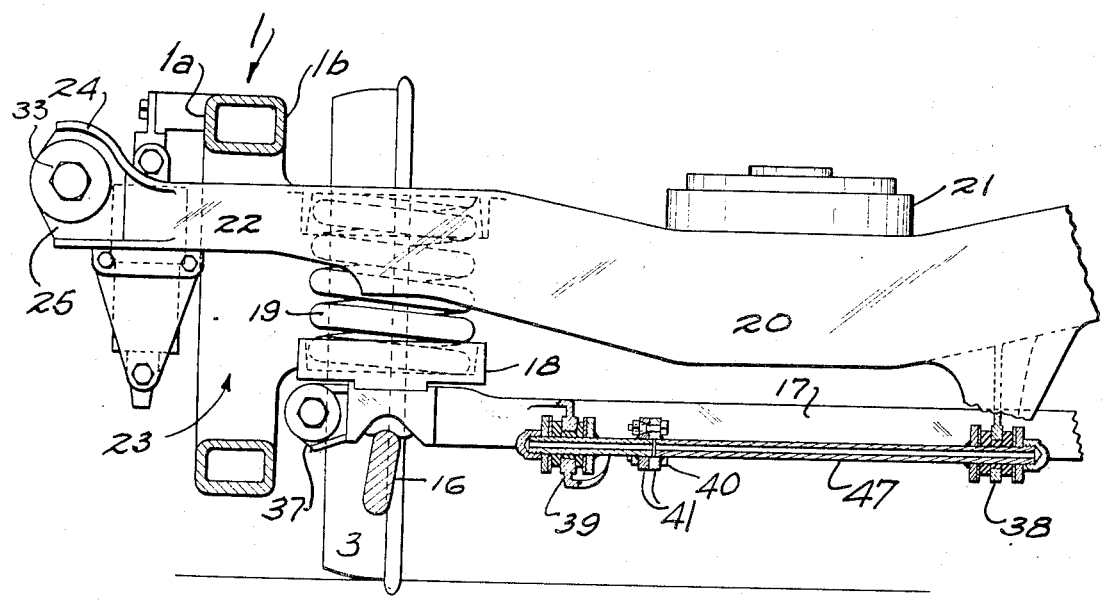
Figure 3 is a vertical transverse section taken on the line 3—3 of Figure 1 and shows portions sectioned on the line 3a—3a of Figure 1.

The truck frame includes side members 1, one of which is shown, and these members at opposite sides of the truck are connected by transoms 2. Preferably the truck frame comprises a one-piece casting and the main parts, such as the side members and the transom members, are of box section for maximum strength and rigidity.

The truck frame will be supported from the truck wheels, one of which is indicated at 3, in any suitable manner, but the support indicated comprises journal box elements 4 and truck springs 5 carried thereby, as more clearly disclosed in said earlier filed application.

U-shaped links 10 are pivotally suspended from each end of each transom 2 and each pair of links supports a seat 11 for coil springs 12 which carry a spring cap 13 forming a bearing for the pivot pin 14 of a swing hanger 15, as more clearly illustrated in the earlier filed application mentioned above and also in Christianson and Jabelmann Patent 2,129,910, issued September 13, 1938.

A cross bar 16 is carried by the lower ends of hangers 15, and a spring plank or spring beam 17 extends between and is carried by cross bars 16 at opposite sides of the truck and is provided with seats 18 for the coil springs 19 on which rests the truck bolster 20. The bolster has the usual center plate 21 for mounting the vehicle body center plate (not shown) and the bolster end portions 22 extend outwardly of the truck through openings 23 in the frame side members 1 and each end of the bolster is provided with a bracket 24 having an upright leg 25 facing longitudinally of the truck.

The side frame is provided with a Z-shaped bracket having an upright web 26 facing longitudinally of the truck and aligned longitudinally of the truck with web 25 of bracket 24. The frame bracket also includes an upper horizontal flange 27 and a lower horizontal flange 28 which merges with the outer wall 1a of the side frame. The lower flange 28 extends inwardly of wall 1a as indicated at 28a and merges with the inner wall 1b of the side frame.

A draft rod 29 is connected at its ends to the upright webs 25 and 26 respectively, each connection comprising rubber pads 30 clamped between the corresponding web and opposing flanges 31 and 32 on the rod. Preferably the inner flange is fixed to a tube surrounding the rod and the outer flange is adjustably held by a nut 33.

The position of the bolster longitudinally of the truck is yieldingly maintained by rod 29, and this position may be adjusted by one or more washers 34 between the rubber pads and the rod flanges 31 and 32. The forces applied longitudinally of the truck between the frame and bolster are transmitted through the rod, and flange extension 28a carries these forces through the side frame to its inner wall 1b.

To further check relative movement of the bolster and the frame longitudinally of the truck and to hold the bolster and its supporting structure in substantial vertical alignment, there is provided another draft rod 35 connected at its left hand end to a bracket 36, depending from the bottom of the left hand transom 2, and connected at its right hand end to a bracket 37, projecting from the end of spring plank 17. The connection between the ends of rod 35 and brackets 36 and 37, respectively, correspond to those between the ends of rod 29 and the brackets associated therewith.

The upright coil springs 19 supporting the bolster from the spring plank tend to yield horizontally of the truck and such yielding adds to the easy riding qualities of the truck because vibrations and shocks are thereby absorbed by the springs, but some forces tending to move the bolster transversely of the truck may be so great as to deflect the upper ends of springs 19 to an undesirable extent. To prevent such deflection, one or more draft rods 47 are provided, each being connected at its opposite ends to brackets 38 and 39 on the bolster and spring plank respectively.

Rod 47 corresponds in construction and operation to rods 29 and 35 but includes the additional feature of being made in two parts separable from each other and detachably secured to each other by bolts 40 through collars 41 on the opposing ends of the rod parts. Each rod part has an inner collar 41 fixed thereon and extends through the collars at opposite sides of the bracket to which the rod part is attached, one of the bracket opposing collars being fixed to the rod part by welding or otherwise and the other collar being adjustably secured to the rod part by threading and pinning, as detailed in the above-mentioned earlier filed application.

Figure 4:
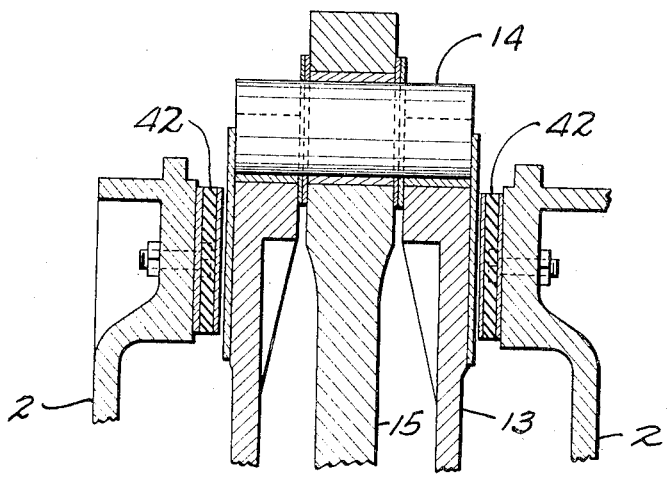
Figure 4 is a detailed vertical section extending longitudinally of the truck and taken on the line 4—4 of Figure 1.

As detailed in Figure 4, rubber pads 42 are applied to the transom walls which oppose the sides of the floating spring cap 13, thus cushioning and eliminating undesirable effects due to the inertia of the spring cap which might occur at this point, or due to the lateral shifting of the spring cap because of horizontal deflection of its supporting springs 12, such as might be caused by action of the brakes or rapid acceleration of the vehicle.

The features described increase the easy riding qualities of the truck and are particularly adapted to stabilize the bolster movements without interfering with the desirable vertical and transverse movements of the bolster as provided by its supporting springs and swing hanger and swing link mounting.

Due to the fact that the bolster springs are very flexible and the fact that the swing hangers are comparatively long and the fact that the parts are very flexibly connected together, longitudinally-extending anchor rods keep the spring plank from shifting longitudinally and throwing the springs and hangers out of proper alignment While each of the draft rods is intended primarily to yieldingly resist forces applied longitudinally of that rod, the gripping of the parts, to which the rod is connected, between large diameter rubber cushions as illustrated tends to provide yielding resistance to the relative movements of the parts transversely of the length of the rod, and this resistance increases progressively as the rod is inclined from its normal position.

The divided construction of draft rods 47 facilitates the disassembly and reassembly of the parts connected by the draft rod without change in their relative position, which may be advantageous in some installations. In any event, the divided construction of draft rods 47 facilitates the removal and application of these rods to the bolster and spring plank after the latter are assembled as the corresponding ends of a divided rod can be applied readily to the spring plank and the bolster before the latter are assembled with each other.

Rods 29 and 35 are more easily accessible from the side of the truck frame and hence there is less advantage in having them of jointed construction. Nevertheless, this jointed construction may be used if desired and, where used, the parts connected by a rod may be disassembled without affecting the initial adjustment of the elements which clamp the rubber and the part flange between them.

Variations in the details of construction may be made without departing from the spirit of the invention, and the exclusive use of such modifications as come within the scope of the claims is contemplated.

What is claimed is:

1. In a railway truck, a truck frame part, swing hangers pivotally suspended therefrom, a spring plank part supported from said hangers, springs carried on said spring plank part, a load-carrying bolster supported by said springs, and an anchor rod extending longitudinally of the truck with its opposite ends secured respectively to said frame part and spring plank part to resist their relative movement longitudinally of the truck.

2. A truck as described in claim 1 in which the connection between the anchor rod and at least one of the truck parts includes rubber-like material to cushion forces exerted longitudinally of the truck and transmitted through the anchor rod to said truck parts.

3. In a railway truck, a truck frame of cast metal including a wheel piece having spaced upright walls, extending longitudinally of the truck, and spaced transverse transoms merging with the inner of said walls, the outer of said walls having a relatively large opening opposite one of said transoms to lighten the casting and avoid abnormal strains in the casting of the frame, a bolster between said transoms and mounted on said frame for movement vertically and laterally relative thereto, an anchor rod extending longitudinally of the truck with its ends connected respectively to said bolster and the outer of said wheel piece walls adjacent said opening, there being a horizontal web between said walls adjacent to the connection of said rod to the frame to transmit forces from said rod to the inner of said walls.

4. In a railway truck, a frame, bolster carrying structure on said frame and providing for movement of the bolster laterally of the truck relative to said structure, and an anchorage device extending transversely of the truck and having at one end a yielding connection to said bolster and having at its other end a yielding connection to said structure, said device yieldingly resisting relative movement of said bolster and structure transversely of the truck, means associated with said yielding connections for adjusting the effective length of said device, said device including a separable joint of rigid material between its connections to said bolster and structure whereby the bolster and structure may be disassembled and reassembled without varying the effective length of said device and the relations between said bolster and structure when assembled.

5. In a railway truck, a truck frame part, a spring plank part supported from said frame part so that said parts have relative movement transversely of the truck, springs carried on said spring plank part, a load-carrying bolster supported from said springs, and an anchor device extending longitudinally of the truck with its opposite ends connected respectively to said parts to resist their relative movement longitudinally of the truck, the connections between the ends of the anchor device and the truck parts including yielding elements cushioning the thrusts between the truck parts and accommodating their relative movement transversely of the truck.

6. In a railway truck, a truck frame part, a spring plank part supported from said frame part so that said parts have relative movement transversely of the truck, springs carried on said spring plank part, a load-carrying bolster supported from said springs, and an elongated anchor device extending longitudinally of the truck with one end having connection to said frame part and its other end having a connection to said spring plank part to resist their relative movement longitudinally of the truck, said connections providing for inclination of the anchor device transversely of its axis to accommodate relative movement of said parts vertically and transversely of the truck.

7. In a railway truck, a truck frame, swing hangers pivotally suspended therefrom and provided with spring seats, springs carried by said hangers, a load-carrying bolster mounted on said springs and hangers so as to swing transversely of the truck, and an elongated anchoring device extending longitudinally of the truck with one end having a connection to the truck frame and with its other end having a connection to the spring seat, said anchoring device resisting relative movement of the frame and spring seat longitudinally of the truck but said connections accommodating movement of the frame and spring seat relative to each other vertically and transversely of the truck.

JAMES C. TRAVILLA, Jr.
OTTO JABELMANN.